Oct. 29, 1929.  W. H. BOT  1,733,643
SELF ADJUSTING DEVICE
Filed March 23, 1928  2 Sheets-Sheet 2

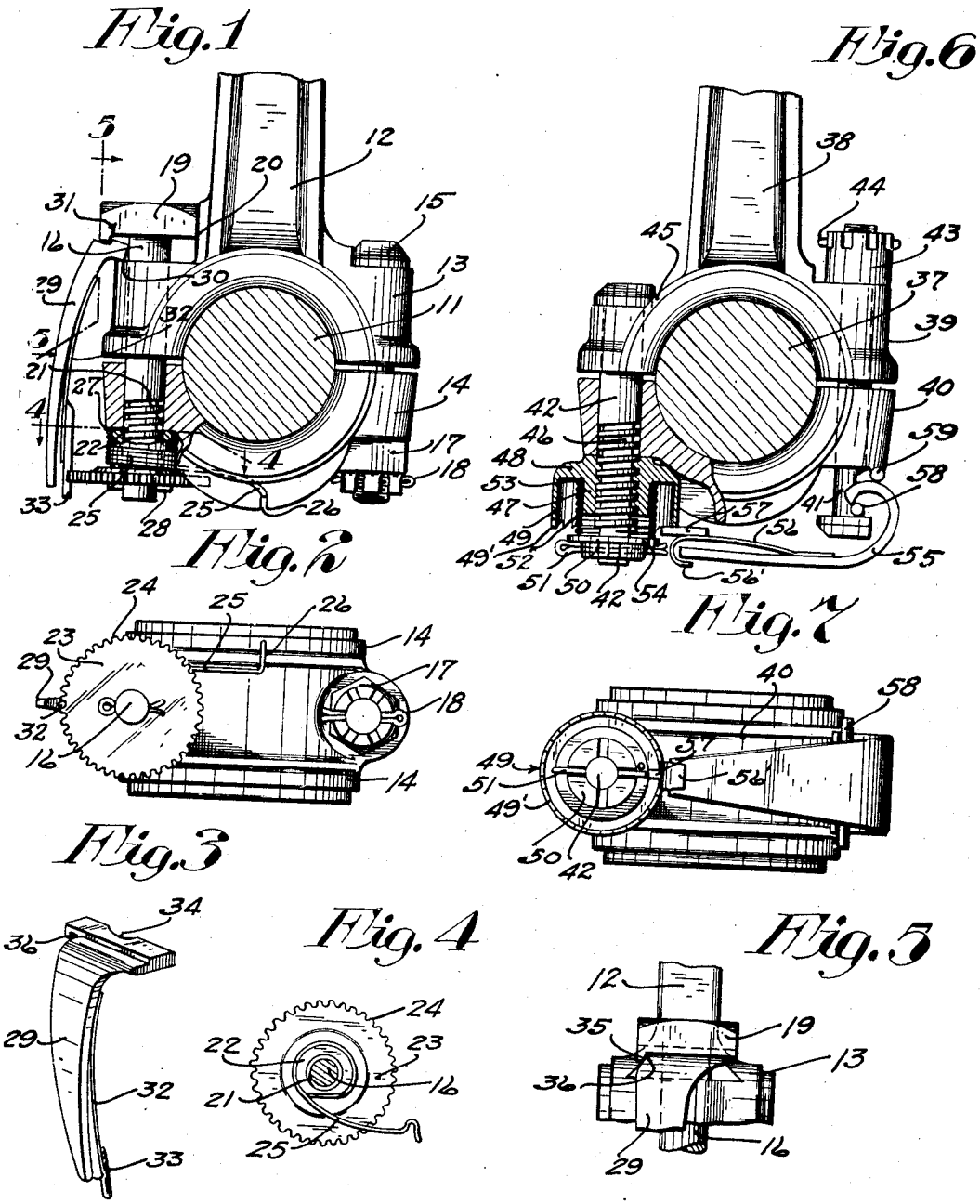

Inventor
William H. Bot
By his Attorneys
Merchant and Kilgore

Patented Oct. 29, 1929

1,733,643

UNITED STATES PATENT OFFICE

WILLIAM H. BOT, OF GHENT, MINNESOTA

SELF-ADJUSTING DEVICE

Application filed March 23, 1928. Serial No. 264,109.

My present invention relates to a self-adjusting device intended for general use, but especially adapted for bearings, and more particularly connecting rod bearings and the like.

The object of the invention is to provide a self-adjusting device that will not only automatically take up a bearing to compensate for wear, but at the same time will hold the bearing with an approximate predetermined clearance so that there is no binding action or drag between said bearing and member mounted therein, thus reducing friction and wear between the several parts.

In the accompanying drawings, which illustrate the invention, like characters indicate like parts throughout the several views.

Referring to the drawings:

Fig. 1 is a fragmentary view partly in elevation and partly in section showing a connecting rod having one form of the invention embodied therein and also showing a crank shaft to which the connecting rod is connected;

Fig. 2 is an inner end view of the connecting rod;

Fig. 3 is a perspective view of the compensating lever removed from the connecting rod;

Fig. 4 is a detail view with some parts sectioned on the line 4—4 of Fig. 1;

Fig. 5 is a fragmentary detail view with some parts sectioned on the line 5—5 of Fig. 1;

Figs. 6 and 7 are views corresponding to Figs. 1 and 2, respectively, but showing another form of the invention;

Figure 8:
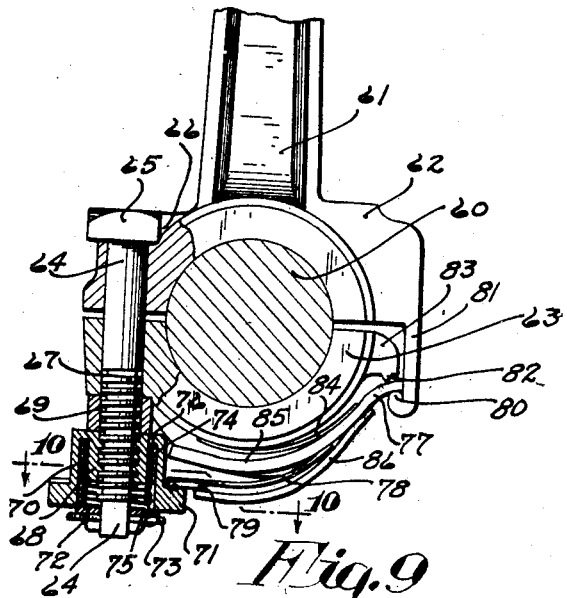
Figure 10:
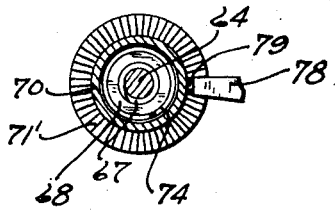
Figure 9:
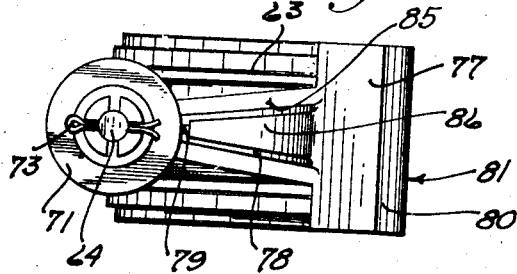

Figs. 8 and 9 are views corresponding to Figs. 1 and 2, but showing still another form of the invention; and Fig. 10 is a detail view with some parts sectioned on the line 10—10 of Fig. 8.

Referring first to the invention as shown in Figs. 1 to 5, inclusive, the numeral 11 indicates a crank shaft and the numeral 12 indicates one of the connecting rods of an internal combustion engine and having a bearing 13 with a removable cap 14 in which the crank shaft 11 is journaled. Said bearing 13 and cap 14 are detachably connected by diametrically opposite bolts 15 and 16 passed through aligned bores in said bearing and cap. The bolt 15 is provided with a nut 17 held from turning on said bolt by a cotter pin 18 passed through a bore in said bolt and aligned notches in the nut 17. The bolt 16 is provided with a square head 19 which engages the stop surface 20 on the connecting rod 12 and holds said bolt from turning in the bearing 13 and cap 14, but with freedom for endwise movement. Said bolt 16 has a square thread 21, to which is applied a sleeve-like nut 22 which engages the cap 14 as a base of resistance. This nut 22 has rigidly secured to its outer end a disc-like head 23 in the periphery of which are circumferentially spaced relatively small and closely positioned notches or teeth 24, for a purpose that will presently appear.

Encircling the nut 22 is a coiled spring 25, one end of which is anchored at 26 to the cap 14 and the other end of which is attached at 27 to the nut 22. This spring 25 is under tension and arranged to rotate the nut 22 in a direction to advance the same on the bolt 16. A cotter pin 28 extending through the bolt 16 outward of the nut head 23, is spaced therefrom and prevents the nut 22 from being detached from the bolt 16. It is highly important to note that the cap 14 is spaced from the bearing 13 to permit said cap to be adjusted to take up wear between the bearing and its cap 14 and the crank shaft 11.

As previously stated, the spring 25 is under tension to advance the nut 22 on the bolt 16 and adjust the cap 14 in respect to the bearing 13 to compensate automatically for wear between the crank shaft 11, bearing 13 and its cap 14.

To retard the advancing movement of the nut 22 on the bolt 16 under the action of the spring 22 and thereby always keep the bearing 13 and its cap 14 adjusted in respect to each other to leave an approximate predetermined clearance in respect to the crank shaft 11 of say 1/500 or 1/1000 of an inch to prevent said bearing and its cap from being adjusted too tightly onto the crank shaft 11 and thereby produce undue friction and cause unnecessary wear, there is provided a lever 29 that normally holds the nut 22 against the action of the spring 25. This lever 29 is L-shaped and its short arm extends between the bearing 13 and bolt head 19 and is pivoted at 30 to said bearing and fulcrumed at 31 to said bolt head. The long arm of the lever 29 extends downward substantially parallel to the bolt 16 and has secured thereto a flat leaf spring 32. One end of this spring 32 is secured to the inner face of the lever 29 near the fulcrum 31 and has on its free or lower end a pin 33 which normally projects laterally into one of the notches 24 and holds the nut 22 from advancing on the bolt 16 under the action of the spring 25.

By reference to Figs. 3 and 5, it will be noted that the bolt head 19 and lever 29 at the fulcrum 31 have overlapping shoulders that connect said lever to the bolt head 19 for hinge-like movement and prevent the same from moving out of contact or position in respect to the bolt head 19. It will also be noted that the lever 29 is notched at 34 to receive the bolt 16 and thereby hold the lever against edgewise shifting movement in respect to the bolt 16. The lever 29 at its fulcrum 31 is of the same width as the bolt head 19 and thereby affords a long bearing surface for the lever 29 with the bolt head 19. In addition to the overlapping shoulders on the bolt head 19 and lever 29, said lever is further held in position in respect to the bolt head 19 by a depending stud 35 on said bolt head which projects into a notch 36 in said lever.

The mounting of the short end of the lever 29 between the bearing 13 and bolt head 19 is such that the long arm of the lever 29 is pressed laterally toward the bolt 16 and places the spring 32 under sufficient tension to hold its pin 33 in one of the notches 24 and thereby hold the nut 22 from advancing on the bolt 16 under the action of the spring 25. As wear takes place between the bearing 13 and its cap 14 and the crank shaft 11, the distance between the bearing 13 and bolt head 19 is increased and thereby releasing the pressure on the lever 29 and permit the compressed spring 32 to swing said lever 29 laterally outward from the bolt 16 and as the pressure on the spring 32 is reduced by this outward movement, the tension of the spring 25 tending to rotate the nut 22 overcomes the spring 32 and moves its pin 33 out of the engaged notch 24 with a cam action, thus temporarily releasing the nut 22 and allowing the spring 25 to advance the nut 22 on the bolt 16 to adjust the bearing 13 and its cap 14 onto the crank shaft 11 to compensate for wear.

As the nut 22 is advanced on the bolt 16 by the spring 25 the bolt head 19 will be drawn toward the bearing 13 thereby operating the lever 29 and swing its long arm toward the bolt 16 which again places the spring 32 under sufficient tension to hold its pin 33 in one of the engaged notches 24 and thereby stop or intercept further advance of the nut 22 on the bolt 16 by the spring 25.

In view of the relatively short distance between the pivot for the lever 29 and its fulcrum 31, and the combined length of the spring 32 and its pin 33 very slight movement of the bolt head 19 toward the bearing 13 under the advancing movement of the nut 22 on said bolt is required to cause the lever 29 to put sufficient tension on the spring 32 to stop further rotation of the nut 22 by the spring 25. It will be noted that the long arm of the lever 29 overlaps the spring 32 throughout its entire length and as the lever 29 is moved toward the bolt 16 it gradually contacts with the flat spring 32, thereby shortening the operative length of said spring and increasing its tension. The movement of the pin 33 away from the nut 23 is limited by the lever 29.

From the above description it is evident that during the adjustment of the bearing 13 and its cap 14 on the crank shaft 11 under the advancing movement of the nut 22 by the spring 25, such movement is automatically intercepted under the action of the lever 29 at the proper time to leave the desired clearance between the bearing 13 and its cap 14 and crank shaft 11. When this clearance has been increased by wear to such a point that the lever 29 no longer holds the spring 32 under sufficient tension to prevent the spring 25 from advancing the nut 22 on the bolt 16, the tension of the spring 32 is overcome by the spring 25 and permits further take-up of the bearing 13 and its cap 14 to compensate for wear.

Referring now to the invention as shown in Figs. 6 and 7, the crank shaft, connecting rod, bearing and bearing cap are indicated by the numerals 37, 38, 39 and 40, respectively. The bearing 39 and its cap 40 are adjustably connected by a pair of diametrically opposite bolts 41 and 42, the former of which is provided with a nut 43 held from turning on the bolt 41 by a cotter pin 44 which extends through a bore and aligned notches in the nut 43. The head of the bolt 42 is provided with a flat face that engages a stop surface 45 on the bearing 39 and holds said bolt from turning in respect to said bearing. Said bolt 42 is provided with a square thread 46 and has a cylindrical nut 47 applied thereto. This nut 47 has a spring cap 48, a skirt 49 and engages the cap 40 as a base of resistance. A spring base 50 is applied to the bolt 42 outward of the cap 40 and is detachably secured thereto by a cotter pin 51.

Encircling the body of the nut 47 between the spring cap 48 and spring base 50 is a coiled spring 52, one end of which is attached at 53 to the spring cap 48 and the other end of which is anchored at 54 to the spring base 50. This spring 52 is under tension to advance the nut 47 on the bolt 42 and draw the bearing 39 and its cap 40 toward each other.

Normally the nut 47 is held against the action of the spring 52 to leave a substantially predetermined clearance between the bearing 39 and its cap 40 and the crank shaft 37 by a lever 55 having a flat spring 56 on the free end of which is a pin 57 that normally engages one of a plurality of ratchet teeth 49' formed in the outer annular edge portion of the skirt 49.

One end of the lever 55 is pivoted on a transverse pin 58 on the under side of the head of the bolt 42 and is intermediately fulcrumed to a transverse pin 59 on the bearing cap 40. The arm of the lever between the pin 58 on which it is pivoted and the fulcrum 59 is very short compared to the other arm of said lever which is curved outwardly and inwardly over the head of the bolt 41 an projects radially toward the bolt 42. It may be here stated that there is sufficient clearance between the bearing 39 and its cap 40 and the bolts 41 and 42 to permit the cap 40 to hingedly move in respect to the bearing 39. The face of the bolt 41 at the pin 58 is flattened and the pivoted end of the lever 55 is bifurcated to receive the bolt 41 at its flattened face which holds said lever against edgewise shifting movement longitudinally on the pin 58. One end of the spring 56 is rigidly secured to the inner face of the lever 55 and the pin 57 is secured to its other end and projects radially in respect to the skirt 49. The free end portion of the spring 56 is curved to form a hook 56' which limits the separating movement of the lever 55 and pin 57.

When the cap 40 is adjusted in respect to the bearing 39 to leave the proper clearance between said bearing and its cap and the crank shaft 37, the pressure on the lever 55 at its fulcrum 59 is such as to swing the long arm of said lever toward the cap 40 and place the spring 56 which is held by the engagement of its pin 57 with the skirt 49 under sufficient tension to hold said skirt from rotating and hence the nut 47 against the tension of the spring 52.

As wear takes place between the bearing 39 and its cap 40 and the crank shaft 37, the pressure on the lever 55 at its fulcrum 59 is reduced and the spring 56 moves the long arm of said lever away from the cap 40 and thereby reduces the tension on said spring. When the tension of the spring 56 has been reduced to such an extent that it can no longer hold the nut 47 from being advanced on the bolt 42 by the spring 52, the ratchet teeth 49' will ride over the pin 57 and release the head nut 47. During this rotation of the nut 47, the respective end of the cap 40 is moved toward the bearing 39 thereby causing the fulcrum 59 to put sufficient pressure on the lever 55 as to swing its long arm inward. This inward movement of the lever 55 again places the spring 56 under sufficient tension to cause the pin 57 by its engagement with one of the ratchet teeth 49' to overcome the tension of the spring 52 and prevent further rotation of the nut 47 with an approximate predetermined clearance between the bearing 39 and its cap 40 and the crank shaft 47. The proportions of the lever 55 on opposite sides of the fulcrum 59 is such that very little wear between the bearing 39 and its cap 40 and the crank shaft 37 is necessary to cause said lever to reduce the tension on the spring 56 sufficiently to allow the spring 52 to overcome the spring 56 and advance the nut 47 on the bolt 42 and adjust the cap 40 to take up the wear.

Referring now to the invention shown in Figs. 8, 9 and 10, the crank shaft, connecting rod, bearing and bearing cap are indicated by the numerals 60, 61, 62 and 63, respectively. Said bearing 62 and its cap 63 are adjustably connected by a single bolt 64 which extends through aligned bores in said bearing and cap and is provided with a square head 65 which engages a shoulder 66 on the bearing 62 and holds the bolt 64 from rotating in respect to said bearing. Said bolt 64 is provided with a square thread 67 to which is applied a nut 68 that engages the cap 63 as a base of resistance.

The nut 68 is provided with a spring cap 69 and skirt 70 on the outer edge portion of which is an external annular flange 71 having on its inner face a multiplicity of circumferentially spaced radially extended notches or serrations 71'. Applied to the bolt 64 outward of the skirt 70 is a spring base 72 held in place by a cotter pin 73 which extends through a bore in said bolt and aligned notches in said base.

Encircling the nut 68 between the spring cap 69 and the spring base 72 is a coiled spring 74, one end of which is anchored at 75 to the spring base 72 and the other end of which is attached at 76 to the spring cap 69. This spring 74 is arranged and under tension to advance the nut 68 on the bolt 64 and draw the respective ends of the bearing 62 and cap 63 toward each other.

To normally hold the nut 68 from advancing on the bolt 64 under the action of the spring 74 with an approximately predetermined clearance between the bearing 62 and its cap 63 and the crank shaft 60, there is provided a lever 77 having a flat spring 78 on the free end of which is a pin 79 that extends radially into one of the notches 71'. One end of the lever 77 is pivoted at 80 to a wide lug 81 integrally formed with the bearing 62 diametrically opposite the bolt 64 and is fulcrumed at 82 on a lug 83 formed with the cap 63.

The length of the short arm of the lever 77 which extends between the pivot bearing 80 and fulcrum 82 is very short compared to the long arm of said lever.

Obviously, the fulcrum 82 hingedly supports the cap 63 on the lever 77 from the bearing 80 for swinging movement toward and from the cap 63. The spring 78 at its inner end is attached to the outer face of the lever 77. A leaf spring 84, one end of which is attached to the inner face of the lever 77 extends between a pair of ribs 85 on the cap 63 and holds the lever 77 against edgewise shifting movement in respect to said cap.

A relatively soft metal bar 86 extends substantially parallel to the lever 77 and its inner end is attached to said lever and its other end is spaced from the pin 79 and affords a stop to limit the movement of said pin from the lever 77. By bending the bar 86, the same may be set different distances from the lever 77 to vary the movement in which the pin 79 can move from the lever 77.

The actions of the device shown in Figs. 8, 9 and 10 is substantially the same as that shown in Figs. 6 and 7 with the exception that a movement of the lever 77 away from the cap 63 is required to place the spring 78 under tension while a movement of the lever 55 toward the cap 40 is required to place the spring 56 under tension.

What I claim is:

1. In a device of the class described, the combination with a bolt and a nut, of means under constant tension for advancing the nut on the bolt to compensate automatically for wear of the parts with which the bolt and nut are associated, and a lever controlled by the parts and normally holding the nut against the action of its advancing means with an approximate predetermined clearance between the parts and operable during excessive movement of one of the parts due to wear to temporarily release the nut.

2. In a device of the class described, the combination with a bolt and a nut, of means under constant tension for advancing the nut on the bolt to compensate automatically for wear of the parts with which the bolt and nut are associated, and a lever having a yielding member normally holding the nut against the action of its advancing means with an approximate predetermined clearance between the parts, said lever being operable during excessive movement of one of the parts due to wear to cause the yielding member to temporarily release the nut.

3. The structure defined in claim 2 in which the lever limits the movement of its yielding member away from the nut.

4. In a device of the class described, the combination with a bolt and a nut, of means under constant tension for advancing the nut on the bolt to compensate automatically for wear of the parts with which the bolt and nut are associated, said nut having circumferentially spaced notches, and a lever having a yielding member engaging one of said notches and normally holding the nut against the action of its advancing means with an approximate predetermined clearance between the parts, said lever being controlled by the parts and operable during excessive movement of one of the parts due to wear to cause its yielding member to temporarily release the nut.

In testimony whereof I affix my signature.

WILLIAM H. BOT.